F. W. SEDLACEK.
LUGGAGE CARRIER FOR AUTOMOBILES.
APPLICATION FILED OCT. 16, 1918.
1,288,698.  Patented Dec. 24, 1918.
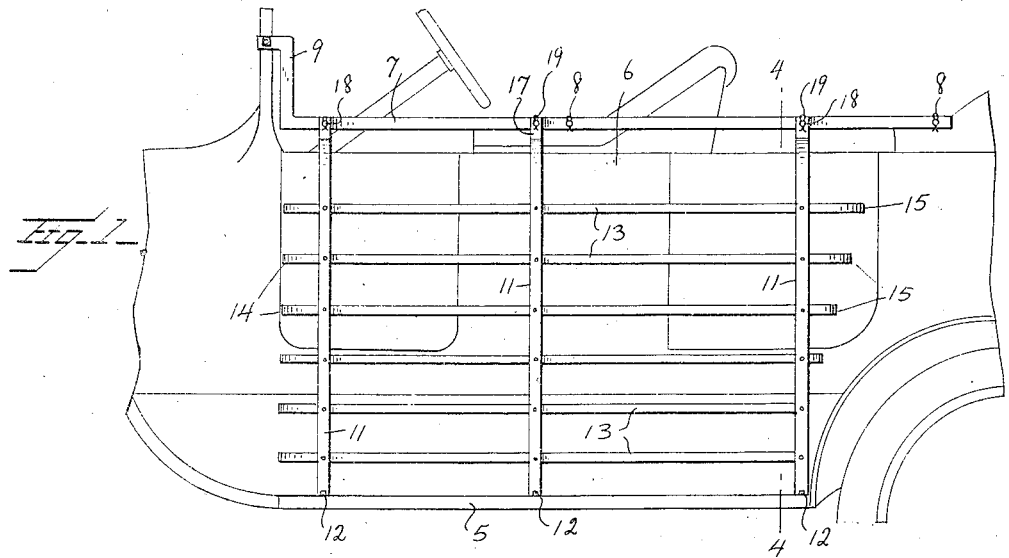
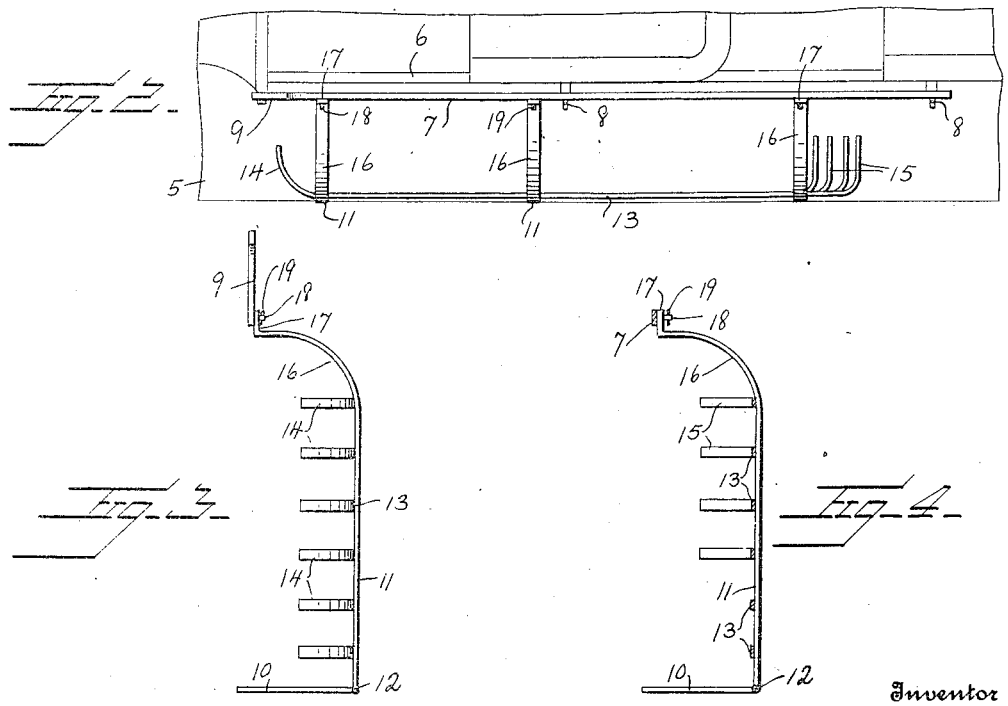
Inventor
F. W. Sedlacek
By Watson E. Coleman
Attorney

UNITED STATES PATENT OFFICE.

FRANK W. SEDLACEK, OF BARNES, KANSAS.

LUGGAGE-CARRIER FOR AUTOMOBILES.

1,288,698. Specification of Letters Patent. Patented Dec. 24, 1918.

Application filed October 16, 1918. Serial No. 258,317.

*To all whom it may concern:*

Be it known that I, FRANK W. SEDLACEK, a citizen of the United States, residing at Barnes, in the county of Washington and State of Kansas, have invented certain new and useful Improvements in Luggage-Carriers for Automobiles, of which the following is a specification, reference being had to the accompanying drawings.

This invention relates to luggage carriers for automobiles, and has for its primary object to provide a very simple and durable attachment especially designed for use in connection with the Ford type of automobile, whereby luggage or bulky packages may be conveniently carried.

It is another and more particular object of the invention to provide a device for the above purpose embodying a frame hingedly mounted upon the running board of a vehicle, a bar fixed to the vehicle body, said frame being adapted for movement to an upright position to compress the luggage against the side of the vehicle body, and means for detachably connecting the upper end of the frame to said bar.

It is also a further general object of my invention to provide a luggage carrier for automobiles which will be highly convenient and serviceable in practical use, may be manufactured at small cost, and is capable of easy application to the body of the vehicle without necessitating any material alterations therein.

With the above and other objects in view, the invention consists in the improved construction, combination and relative arrangement of the several parts as will be hereinafter more fully described, subsequently claimed and illustrated in the accompanying drawing in which similar reference characters designate corresponding parts throughout the several views, and wherein:—

Figure 1 is a side elevation illustrating one embodiment of my invention as applied to the Ford type of automobile;

Fig. 2 is a top plan view;

Fig. 3 is a front end elevation; and

Fig. 4 is a vertical section taken on the line 4—4 of Fig. 1.

Referring in detail to the drawing, 5 designates the running board of a vehicle, 6 the side wall of the vehicle body, and 7 a longitudinally extending metal bar which is provided with openings at spaced points to receive the pins or studs upon which the bow arms of the vehicle top are mounted, said bar being retained in its applied position by the cotter pins, indicated at 8. The front end of the bar is angularly bent, as at 9, for connection at its upper end to the pivot bolt of the lower wind shield section. The device, to be hereinafter described, is applied to the left side of the vehicle body and extends substantially the entire length thereof.

Upon the running board 5, at suitably spaced points, transversely disposed metal bars 10 are bolted or otherwise permanently secured, and upon the ends of these bars, at the outer edge of the running board, the spaced bars 11 of the carrier frame are hingedly mounted, as at 12. Preferably, three of the bars 11 are employed and they are connected to each other by the spaced parallel longitudinally extending bars 13. Each of the latter bars at its forward end is inwardly curved, as shown at 14, toward the wall of the vehicle body. The two lowermost bars 13 at the rear end of the carrier terminate at the bar 11, while the remaining bars 13 successively increase in length and are likewise inwardly curved toward the body of the vehicle, as indicated at 15.

Each of the bars 11, at its other end, is curved inwardly, as shown at 16, and terminates in an angularly disposed lug 17 having an aperture therein to receive a stud 18 fixed in the bar 7. Cotter pins 19 are adapted to be inserted through transverse openings in these studs.

In the use of the device as above described, the cotter pins 19 are removed and the frame consisting of the bars 11 and 13 is swung outwardly and downwardly. The luggage is then arranged between said frame and the side wall of the vehicle body and the frame returned to its upright position, thereby compactly holding the luggage against the body wall. The upper ends of the bars 11 are then engaged on the bolts 18 and the pins 19 inserted. The inwardly curved ends of the bars 13 effectively prevent longitudinal shifting movement of the luggage and it is securely held against all possibility of loss. It will be seen that the carrier does not project outwardly from the body of the vehicle to any great extent and will not, therefore, be unduly conspicuous or constitute an obstruction.

From the foregoing description, taken in connection with the accompanying drawing, the construction, manner of use and several advantages of my invention will be clearly and fully understood. The device is very simple, as well as strong and durable, and very convenient and serviceable in practical use. The carrier can be readily applied to the Ford automobile, as at present constructed, and no material alterations of any character are required therein. The carrier can, of course, be made in different lengths for application to either the runabout or touring type of automobile, and the number of the bars 11 and 13 employed may be increased or decreased as desired. It is, therefore, to be understood that while I have herein shown and described one construction and arrangement of the several elements which I have found to be very satisfactory in practical use, the device is nevertheless susceptible of considerable modification and I, therefore, reserve the privilege of adopting all such legitimate changes as may be fairly embodied within the spirit and scope of the invention as claimed.

I claim:—

1. A luggage carrier for automobiles including a longitudinally extending bar adapted to be fixed to the upper edge of one side wall of the vehicle body, a frame consisting of a plurality of spaced longitudinal bars and a series of bars connecting the longitudinal bars to each other, said latter bars being hingedly mounted upon the running board of the vehicle, and means for detachably connecting the upper ends of said latter bars to said first named bars.

2. A luggage carrier for automobiles including a longitudinally extending bar adapted to be fixed to the upper edge of one side wall of the vehicle body, a frame consisting of a plurality of spaced longitudinal bars and a series of bars connecting the longitudinal bars to each other, said latter bars being hingedly mounted upon the running board of the vehicle, said spaced bars at their opposite ends being inwardly curved toward the body wall of the vehicle, and means for detachably connecting the upper ends of said latter bars to said first named bars.

3. A luggage carrier for automobiles including a longitudinally extending bar secured to the upper edge of one side wall of the vehicle body, spaced transverse bars fixed to the running board of the vehicle, a frame hingedly mounted upon the latter bars and adapted to compress the luggage against the side wall of the vehicle body when said frame is moved to an upright position, and means for detachably connecting said frame to said longitudinal bar.

4. A luggage carrier for automobiles including a longitudinally extending bar secured to the upper edge of one side wall of the vehicle body, spaced transverse bars fixed to the running board of the vehicle, a frame hingedly mounted upon the latter bars and adapted to compress the luggage against the side wall of the vehicle body when said frame is moved to an upright position, a plurality of studs fixed to said longitudinal bar, and means for detachably connecting said frame to the studs.

In testimony whereof I hereunto affix my signature in the presence of two witnesses.

FRANK W. SEDLACEK.

Witnesses:
F. H. CLARK,
JAS. SEDLACEK